United States Patent [19]
Hamakawa et al.

[11] 3,888,927
[45] June 10, 1975

[54] ANTI-INFLAMMATORY N,N'-DISUBSTITUTED AMIDINES

[75] Inventors: Hiroshi Hamakawa; Sadami Kobari; Takeshi Shimizu; Kentaro Fujimoto; Kazuo Hayano; Tetsuo Matsuda, all of Shizuoka, Japan

[73] Assignee: Toyo Jozo Kabushiki Kaisha, Shizuoka, Japan

[22] Filed: June 7, 1974

[21] Appl. No.: 477,347

[30] Foreign Application Priority Data
June 7, 1973   Japan................. 48-64555
June 7, 1973   Japan................. 48-64556

[52] U.S. Cl....... 260/564 R; 260/453 R; 260/566 D; 424/326
[51] Int. Cl.............................. C07c 123/00
[58] Field of Search................. 260/564 R

[56] References Cited
UNITED STATES PATENTS
3,598,800   8/1971   Gätzi................. 260/564 R
3,689,675   9/1972   Knowles............ 260/564 R

*Primary Examiner*—Gerald A. Schwartz
*Attorney, Agent, or Firm*—Young & Thompson

[57] ABSTRACT

N,N'-disubstituted amidines of the formula

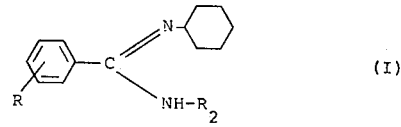

wherein R is hydrogen, o-methyl or m-methyl and $R_2$ is 4-fluorophenyl, 4-bromophenyl, 2,4-dichlorophenyl, 3,4-dichlorophenyl or 2-methoxy-5-chlorophenyl, with the proviso that when $R_2$ is 2-methoxy-5-chlorophenyl, R is hydrogen or o-methyl or m-methyl and when $R_2$ is 4-fluorophenyl, 4-bromophenyl, 3,4-dichlorophenyl or 2,4-dichlorophenyl, R is hydrogen, and the salts thereof of pharmaceutically acceptable acids, have strong anti-inflammatory activity and lower toxicity than known anti-inflammatory agents.

7 Claims, No Drawings

ANTI-INFLAMMATORY N,N'-DISUBSTITUTED AMIDINES

The present invention is concerned with anti-inflammatory N,N'-disubstituted amidines.

The new N,N'-disubstituted amidines according to the present invention are compounds having the formula

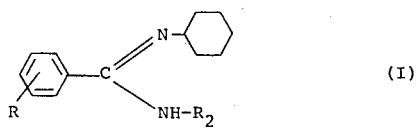
(I)

wherein R is a hydrogen atom or an o- or m-methyl group and $R_2$ is a 4-fluorophenyl, 4-bromophenyl, 2,4-dichlorophenyl, 3,4-dichlorophenyl or 2-methoxy-5-chlorophenyl group, with the proviso that when $R_2$ is 2-methoxy-5-chlorophenyl, R is hydrogen, o-methyl or m-methyl; and when $R_2$ is 4-fluorophenyl, 4-bromophenyl, 2,4-dichlorophenyl or 3,4-dichlorophenyl, R is hydrogen; and the salts thereof of pharmaceutically-acceptable acids.

Heretofore, many compounds have been used clinically as non-steroidal anit-inflammatory agents. However, anti-inflammatory active N,N'-disubstituted amidines have never previously been known.

We have now found that N,N'-disubstituted amidines of formula (I) above have lower toxicity as compared with anti-inflammatory agents on the market and have a strong anti-inflammatory activity.

The new N,N'-disubstituted amidines of formula (I) have been shown, in experiments on rats' foot carrageenin edema to have a strong anti-inflammatory activity, when compared with anti-inflammatory agents on the market, and also have a low acute toxicity in animal experiments.

The new N,N'-disubstituted amidines of formula (I) have the following tautomeric forms:

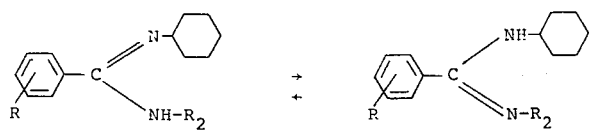

wherein R and $R_2$ have the same meanings as above. Accordingly, these tautomeric forms are within the scope of the present invention.

The new compounds (I) can be prepared, for example, by reacting an imino compound of the formula

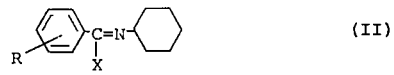
(II)

wherein X is a halogen atom or a YR' group, in which R' is a lower alkyl or aralkyl radical and Y is an oxygen or sulphur atom, and R has the same meaning as above, with an amine of the general formula $R_2 — NH_2$ (III)

wherein $R_2$ has the same meaning as above.

The new amidines (I) can also be prepared by reacting an imino compound of the formula

(IV)

wherein R, $R_2$ and X have the same meanings as above, with cyclohexylamine.

Due to the tautomeric structure of the amidines (I), they are finally produced if the cyclohexyl group in the imino compound (II) is replaced by the $R_2$ group of the amine (III).

The imino compound (II) is a compound having a group capable of reacting with an amino group, for example a halogen atom or an —OR' or —SR' group, in which R' has the same meaning as above, and can be produced by known processes. For example, an imino halide compound [i.e. X is halogen in formula (II)] can be prepared by reacting an appropriate N-substituted amide, such as N-cyclohexyl-o-toluamide, N-cyclohexyl-m-toluamide, N-2-methoxy-5-chlorophenyl-benzamide, N-cyclohexyl-benzamide, N-2-methoxy-5-chlorophenyl-o-toluamide, N-2-methoxy-5-chlorophenyl-m-toluamide, N-4-fluorophenyl-benzamide, N-2,4-dichlorophenyl-benzamide or N-3,4-dichlorophenyl-benzamide, with a halogenating agent. As halogenating agent, there can be used, for example, phosphorus pentachloride, phosphorus oxychloride, phosphorus trichloride, phosgene, thionyl chloride, benzenesulphenyl chloride, p-toluene-sulphonyl chloride or the like, phosgene being preferably used.

The imino chlorides (II) can be easily prepared at a low temperature, by dissolving an N-substituted amide in an anhydrous inert organic solvent, such as tetrahydrofuran, dioxan, benzene, toluene, chloroform or dichloromethane, reacting it with phosgene in a gaseous or liquid state or in the form of a solution in benzene or toluene, in the presence of a tertiary amine, such as triethylamine, pyridine or the like, removing the precipitated tertiary amine hydrochloride from the reaction mixture and concentrating the reaction mother liquor. The imino chloride (II) can be extracted from the concentrate with an inert organic solvent which does not dissolve the N-substituted amide, such as petroleum ether, n-hexane or cyclohexane.

Imino thioesters [i.e. X is YR' in formula (II)] can be prepared, for example, by reacting an appropriate imino halide with a thio alcohol or sodium thioalcoholate under anhydrous conditions. When X is YR' in the imino compound (II), R' is a lower alkyl group, for example, methyl, ethyl, propyl or butyl, or an aralkyl radical, for example, benzyl and Y is oxygen or sulphur.

The amine (III) can be, for example, cyclohexylamine or an aromatic amine of the formula $R_2—NH_2$, for example, 2-methoxy-5-chloraniline, p-fluoroaniline, p-bromoaniline, 2,4-dichloroaniline or 3,4-dichloroaniline, it being understood that when the amine (III) is cyclohexylamine, the cyclohexyl group in imino compound (II) is replaced by an $R_2$ group as hereinbefore defined.

The reaction of an imino compound (II) with an amine (III) is carried out in inert organic solvent, which dissolves the imino compound (II), for example, petroleum ether, n-hexane, cyclohexane, benzene, tetrahydrofuran, dioxan, chloroform or the like. The reaction can generally be carried out at a low temperature or at ambient temperature but the reaction mixture can, of course, be heated when the reaction rate is slow.

The thus synthesized amidine (I) is then isolated and purified by concentrating the reaction mixture, isolating the precipitate formed, dissolving the precipitate in aqueous liquid, such as hydrochloric acid, and washing the solution with a water-immiscible organic solvent which dissolves unreacted N-substituted amide, for example ethyl acetate, butyl acetate, chloroform or dichloromethane, and concentrating the washed solution to precipitate the amidine (I) in the form of an acid salt, for example, as a hydrochloride. Alternatively, the product can be extracted with a water-immiscible organic solvent, after adding alkali to form the free base. The free base can, if desired, then be converted to a salt with an inorganic or organic acid.

The anti-inflammatory activity, analgesic activity and acute toxicity of some of the amidines (I) were determined as follows:

1. Anti-inflammatory action:
Test animals: Rats.
Route of administration: Oral.
Anti-inflammatory activity: Anti-inflammatory activity is calculated by Winter's rat foot edema method [Proc. Soc. Exp. Biol. Med., 111, 544 (1962)] in accordance with the suppressive ratio against carrageenin foot edema. The lowest borderline effective dose is determined as 30% suppression for carrageenin edema.

2. Analgesic activity:
Test animals: Mice.
Route of administration: Oral.
Analgesic activity: Analgesic activity is determined by a method of Sigmund et al. [Proc. Soc. Exp. Biol. Med., 95, 729 (1957)] in accordance with the suppressive ratio on squirm of mice caused by intraperitoneal administration of acetic acid.

3. Acute toxicity:
Test animals: Rats.
Route of administration: Oral.
Acute toxicity: 50% lethal dose ($LD_{50}$) is calculated by the Litchfield-Wilcoxon method in accordance with the death rate 72 hours after administration.

The results obtained are set out in the following table.

The following Examples are given for the purpose of illustrating the present invention:

EXAMPLE 1

20 ml. anhydrous pyridine and 30 g. (0.3 mole) phosgene dissolved in anhydrous 40 ml. benzene were added dropwise, with stirring, to an ice-cold solution of 40.6 g. (0.2 mole) N-cyclohexyl-benzamide dissolved in 300 ml. anhydrous tetrahydrofuran. The reaction was continued for two hours at ambient temperature, whereafter precipitated pyridine hydrochloride was filtered off and the filtrate was concentrated under reduced pressure to give an oily substance containing N-cyclohexylbenzimide chloride. After extraction of this oil with 300 ml. anhydrous petroleum ether 32.4 g. (0.2 mole) 3,4-dichloroaniline dissolved in 140 ml. anhydrous tetrahydrofuran were added dropwise to the extract, while stirring and cooling with ice. After the reaction had proceeded for two hours at ambient temperature, the precipitated product was filtered, then dissolved in 80 ml. ethanol, the pH adjusted to about 2 by dropwise addition of 1N hydrochloric acid and 1 liter water then added. The precipitated material was filtered off, washed, dried and finally recrystallized from ethanol-diethyl ether to give N-cyclohexyl-N'-3,4-dichlorophenyl-benzamidine hydrochloride.

Yield: 54.0 g. (70.4% of theoretical); m.p. 207°–209°C.

Elemental analysis for $C_{19}H_{21}N_2Cl_3$:

| | C | H | N | Cl |
|---|---|---|---|---|
| Calc.: | 59.40%; | 5.51%; | 7.30%; | 27.72% |
| Found: | 59.75%; | 5.95%; | 7.43%; | 27.66% |

EXAMPLE 2

20 ml. anhydrous pyridine and 30 g. (0.3 mole) phosgene dissolved in anhydrous 40 ml. benzene were added dropwise, with stirring, to an ice-cold solution of 40.6 g. (0.2 mole) N-cyclohexyl-benzamide dissolved in 300 ml. anhydrous tetrahydrofuran. The reaction

| Sample | Analgesic activity | | Antiinflammatory activity | | Effective amount for antiinflammatory activity (A) mg./kg. (p.o.) | Acute Toxicity ($LD_{50}$) (B) mg./kg.(p.o.) | Safety score (B/A) |
|---|---|---|---|---|---|---|---|
| | Dose (mg.) | Suppressive ratio (%) | Dose (mg.) | Suppressive ratio (%) | | | |
| N-cyclohexyl,N'-3,4-dichlorphenyl-benzamidine hydrochloride | 200 | 59.0 | 50 | 42.2 | 50 | >2000 | >40 |
| N-cyclohexyl,N'-4-fluorophenyl-benzamidine hydrochloride | 200 | 78.2 | 50 | 37.5 | 50 | >2000 | >40 |
| N-cyclohexyl,N'-2,4-dichlorophenyl-benzamidine hydrochloride | 200 | 62.2 | 50 | 37.2 | 50 | >2000 | >40 |
| N-cyclohexyl,N'-4-bromophenyl-benzamidine hydrochloride | 200 | 78.4 | 50 | 47.7 | 37.5 | >2000 | >53.3 |
| N-cyclohexyl, N'-2-methoxy-5-chlorophenyl-benzamidien hydrochloride | — | — | 12.5 | 34.9 | 12.5 | 625 | 50.0 |
| | | | 25 | 49.1 | | | |
| | | | 50 | 51.5 | | | |
| N-cyclohexyl, N'-2-methoxy-5-chlorophenyl-o-toluamidine hydrochloride | — | — | 50 | 40.0 | 25 | >1000 | >40 |
| | | | 100 | 47.8 | | | |
| N-cyclohexyl, N'-2-methoxy-5-chlorophenyl-m-toluamidine hydrochloride | — | — | 50 | 32.8 | 50 | >1000 | >20 |
| | | | 100 | 56.7 | | | |
| Phenylbutazone | — | — | 50 | 27.5 | 75 | 720 | 9.6 |
| Flufenamic acid | — | — | 50 | 36.1 | 37.5 | 400 | 10.7 |
| Mefenamic acid | 200 | 58.5 | 50 | 35.7 | 50 | 1400 | 28.0 |
| Benzidamine hydrochloride | — | — | 200 | 32.9 | 200 | 740 | 3.7 | was continued for two hours at ambient temperature, whereafter precipitated pyridine hydrochloride was filtered off and the filtrate was concentrated under reduced pressure to give an oily substance containing N-cyclohexyl-benzamide chloride. After extraction of this oil with 300 ml. anhydrous petroleum ether 22.75 ml. (0.24 mole) p-fluoroaniline were added dropwise to the extract, while stirring and cooling with ice. After the reaction had proceeded for two hours at ambient temperature, the precipitated product was filtered, then dissolved in 80 ml. ethanol, the pH adjusted to about two by the dropwise addition of 1N hydrochloric acid and 1 liter water then added. This aqueous solution was washed twice with 300 ml. ethyl acetate, and concentrated. The precipitated material was filtered off, washed, dried and finally recrystallized from ethanol-diethyl ether to give N-cyclohexyl-N'-4-fluorophenyl-benzamidine hydrochloride.

Yield: 36.8 g. (55.3% of theoretical); m.p. 224.5°–226.5°C.

Elemental analysis for $C_{19}H_{22}N_2FCl$:

| | | | |
|---|---|---|---|
| Calc.: | C 68.50%; | H 6.66%; | N 8.42% |
| Found: | 68.24%; | 6.76%; | 8.30% |

EXAMPLE 3

30 g. (0.3 mole) phosgene, dissolved in 40 ml. anhydrous pyridine were added dropwise, with stirring, to an ice cold solution of 40.6 g. (0.2 mole) N-cyclohexyl-benzamidine dissolved in 300 ml. anhydrous tetrahydrofuran. The reaction was continued for two hours at ambient temperature, the precipitated pyridine hydrochloride was filtered off and the filtrate was concentrated under reduced pressure to give an oily substance containing N-cyclohexyl-benzimide chloride.

After extraction of this oily substance with 300 ml. anhydrous petroleum ether, 32.4 g. (0.2 mole) 2,4-dichloroaniline dissolved in 150 ml. anhydrous tetrahydrofuran were added dropwise to the extract, with stirring and while cooling with ice. After the reaction had proceeded for two hours at ambient temperature, the precipitated product was recovered and dissolved in 60 ml. ethanol, the pH adjusted to about 2, and then 1 liter water added thereto. The precipitated product was recovered by filtration, washed, dried and recrystallized from ethanol-diethyl ether to give N-cyclohexyl-N'-2,4-dichlorophenyl-benzamidine hydrochloride.

Yield: 56.7 g. (73.9% of theoretical); m.p. 220°–222°C.

Elemental analysis for $C_{19}H_{21}N_2Cl_3$:

| | | | | |
|---|---|---|---|---|
| Calc.: | C 59.47%; | H 5.51%; | N 7.30%; | Cl 27.72% |
| Found: | 59.49%; | 5.71%; | 7.20%; | 27.65%. |

EXAMPLE 4

20 ml. anhydrous pyridine and 30 g. (0.3 mole) phosgene dissolved in 40 ml. dry benzene were added dropwise, with stirring, to an ice cold solution of 40.6 g. (0.2 mole) N-cyclohexyl-benzamide dissolved in 300 ml. anhydrous tetrahydrofuran. The reaction was continued for two hours at ambient temperature, precipitated pyridine hydrochloride was then filtered off and the filtrate was concentrated under reduced pressure to give an oily substance containing N-cyclohexyl-benzimide chloride. This oily substance was extracted with 300 ml. dry petroleum ether and 34.4 g. (0.2 mole) p-bromoaniline dissolved in 140 ml. anhydrous tetrahydrofuran were added dropwise, with stirring and ice cooling, whereafter the reaction was continued for two hours at ambient temperature. After the precipitated substance had been separated, the product was dissolved in 80 ml. ethanol, the pH was adjusted to about 2 by addition of 1N hydrochloric acid and 1 liter water added thereto. The precipitated product was filtered off, washed, dried and recrystallized from ethanol-diethyl ether to give N-cyclohexyl-N'-4-bromophenyl-benzamidine hydrochloride.

Yield: 55.0 g. (69.8% of theoretical); m.p. 201°–250°C.

Elemental analysis for $C_{19}H_{22}N_2ClBr$:

| | | | |
|---|---|---|---|
| Calc.: | C 57.96%; | H 5.69%; | N 7.11% |
| Found: | 58.12%; | 5.76%; | 7.37%. |

EXAMPLE 5

20 ml. anhydrous pyridine and 30 g. (0.3 mole) phosgene dissolved in 40 ml. dry benzene were added dropwise, with stirring, to an ice cold solution of 40.6 g. (0.2 mole) N-cyclohexyl-benzamide dissolved in 300 ml. anhydrous tetrahydrofuran. The reaction was continued for two hours at ambient temperature, then the precipitated pyridine hydrochloride filtered off and the filtrate was concentrated under reduced pressure to give an oily material containing N-cyclohexyl-benzimide chloride. The oily material obtained was extracted with 300 ml. dry petroleum ether and 37.8 g. (0.24 mole) 2-methoxy-5-chloroaniline dissolved in 150 ml. anhydrous tetrahydrofuran added dropwise, with stirring and ice cooling. After the reaction had proceeded for two hours at ambient temperature, the precipitated product was recovered by filtration, then dissolved in 70 ml. ethanol, the pH adjusted to about 2 by the dropwise addition of 1N hydrochloric acid and 1 liter water added thereto. The precipitated product was recovered by filtration, washed, dried and recrystallized from ethanol-diethyl ether to give N-cyclohexyl-N'-2-methoxy-5-chlorophenyl-benzamidine hydrochloride.

Yield: 47.5 g. (62.6% of theoretical); m.p. 226°–227°C.

Elemental analysis for $C_{20}H_{24}N_2O Cl_2$:

| | | | | |
|---|---|---|---|---|
| Calc.: | C 63.33%; | H 6.33%; | N 7.38%; | Cl 18.69% |
| Found: | 63.14%; | 6.52%; | 7.19%; | 18.69%. |

EXAMPLE 6

20 ml. anhydrous pyridine and 30 g. (0.3 mole) phosgene dissolved in 40 ml. dry benzene were added dropwise, with stirring, to an ice cold solution of 43.5 g. (0.2 mole) N-cyclohexyl-o-toluamide dissolved in 300 ml. anhydrous tetrahydrofuran. The reaction was continued for two hours at ambient temperature, then the precipitated pyridine hydrochloride filtered off and the filtrate was concentrated under reduced pressure to give an oily material containing N-cyclohexyl-o-toluimide chloride. The oily material obtained was extracted with 300 ml. dry petroleum ether and 37.8 g. (0.24 mole) 2-methoxy-5-chloroaniline dissolved in 150 ml. anhydrous tetrahydrofuran added dropwise, with stirring and ice cooling. After the reaction had proceeded for two hours at ambient temperature, the precipitated product was recovered by filtration, then dissolved in 70 ml. ethanol, the pH adjusted to about 2 by the dropwise addition of 1N hydrochloric acid and 1 liter water added thereto. The aqueous solution was washed twice with 300 ml. ethyl acetate and then concentrated in vacuo. The precipitated product was recovered by filtration, washed, dried and recrystallized from ethanol-diethyl ether to give N-cyclohexyl,N'-2-methoxy-5-chlorophenyl-o-toluamidine hydrochloride. Yield: 50.0 g. (63.6% of theoretical); m.p. 210°–211.5°C.

Elemental Analysis for $C_{21}H_{26}N_2OCl_2$:

| | C 64.12%; | H 6.66%; | N 7.12%; | Cl 18.03% |
|---|---|---|---|---|
| Calc.: | C 64.12%; | H 6.66%; | N 7.12%; | Cl 18.03% |
| Found: | 63.88%; | 6.78%; | 7.30%; | 17.86% |

EXAMPLE 7

In Example 6, the N-cyclohexyl-o-toluamide was replaced by N-cyclohexyl-m-toluamide to give N-cyclohexyl-N'-2-methoxy-5-chlorophenyl-m-toluamidine hydrochloride.
Yield: 53.5 g. (68.0% of theoretical); m.p. 209°–212°C.

Elemental Analysis for $C_{21}H_{26}N_2OCl_2$:

| | C 64.12%; | H 6.66%; | N 7.12%; | Cl 18.03% |
|---|---|---|---|---|
| Calc.: | C 64.12%; | H 6.66%; | N 7.12%; | Cl 18.03% |
| Found: | 64.29%; | 6.59%; | 7.00%; | 18.24% |

Having described our invention, we claim:
1. N-cyclohexyl-N'-3,4-dichlorophenyl-benzamidine hydrochloride.
2. N-cyclohexyl-N'-4-fluorophenyl-benzamidine hydrochloride.
3. N-cyclohexyl-N'-2,4-dichlorophenyl-benzamidine hydrochloride.
4. N-cyclohexyl-N'-4-bromophenyl-benzamidine hydrochloride.
5. N-cyclohexyl-N'-2-methoxy-5-chlorophenyl-benzamidine hydrochloride.
6. N-cyclohexyl-N'-2-methoxy-5-chlorophenyl-o-toluamidine hydrochloride.
7. N-cyclohexyl-N'-2-methoxy-5-chlorophenyl-m-toluamidine hydrochloride.

* * * * *